(12) United States Patent
Kline et al.

(10) Patent No.: US 10,762,089 B2
(45) Date of Patent: Sep. 1, 2020

(54) OPEN ENDED QUESTION IDENTIFICATION FOR INVESTIGATIONS

(71) Applicant: INTERNATIONAL BUSINESS MACHINES CORPORATION, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 300 days.

(21) Appl. No.: 15/831,859

(22) Filed: Dec. 5, 2017

(65) Prior Publication Data
US 2019/0171745 A1 Jun. 6, 2019

(51) Int. Cl.
| | |
|---|---|
| *G06F 16/2457* | (2019.01) |
| *G06N 5/00* | (2006.01) |
| *H04W 4/38* | (2018.01) |
| *G06F 9/451* | (2018.01) |
| *G06F 16/9038* | (2019.01) |
| *G06F 16/9032* | (2019.01) |
| *G06F 40/30* | (2020.01) |

(52) U.S. Cl.
CPC ........ *G06F 16/24575* (2019.01); *G06F 9/453* (2018.02); *G06F 16/24573* (2019.01); *G06F 16/9038* (2019.01); *G06F 16/90332* (2019.01); *G06F 40/30* (2020.01); *G06N 5/003* (2013.01); *H04W 4/38* (2018.02)

(58) Field of Classification Search
CPC ...................................................... G06N 5/003
See application file for complete search history.

(56) References Cited

U.S. PATENT DOCUMENTS

| | | |
|---|---|---|
| 9,477,755 B2 | 10/2016 | Oral et al. |
| 9,563,656 B2 | 2/2017 | Castellani et al. |
| 9,569,488 B2 | 2/2017 | Boyer et al. |
| 9,576,576 B2 | 2/2017 | Sharifi et al. |
| 9,672,475 B2 | 6/2017 | Clark et al. |
| 9,686,087 B2 | 6/2017 | Chang et al. |

(Continued)

OTHER PUBLICATIONS

StackExchange, What is the point of the Red Thread/Tape around evidence or newspaper clippings?, from https://movies.stackexchange.com/questions/49575/what-is-the-point-of-the-red-thread-tape-around-evidence-or-newspaper-clippings (Year: 2016).*

(Continued)

*Primary Examiner* — William Spieler
(74) *Attorney, Agent, or Firm* — Cantor Colburn LLP; Tihon Poltavets (57) ABSTRACT

Embodiments of the invention include methods and systems for question identification. Aspects of the invention include receiving, by a processor, an investigation profile, wherein the investigation profile associated with an investigation comprises a plurality of questions. Observation data associated with the investigation is received and one or more concepts are extracted from the observational data. The one or more concepts are mapped to the plurality of questions to generate one or more answers to the plurality of questions. The one or more answers to the plurality of questions are analyzed to identify unanswered questions from the plurality of questions.

19 Claims, 7 Drawing Sheets

(56) References Cited

U.S. PATENT DOCUMENTS

| | | |
|---|---|---|
| 9,690,774 B1 | 6/2017 | Beason et al. |
| 2012/0041950 A1* | 2/2012 | Koll .................. G09B 7/02 707/728 |
| 2013/0132308 A1* | 5/2013 | Boss .................. G06Q 50/00 706/12 |
| 2013/0246049 A1* | 9/2013 | Mirhaji .............. G06F 17/274 704/9 |
| 2016/0140453 A1 | 5/2016 | Adderly et al. |
| 2016/0300139 A1 | 10/2016 | Bhat et al. |
| 2017/0177715 A1 | 6/2017 | Chang et al. |
| 2017/0178529 A1 | 6/2017 | Chetlur et al. |

OTHER PUBLICATIONS

Brainspores, The Six W's of Investigation, from https://www.brainspores.com/the-six-ws-of-investigation/ (Year: 2014).*

G. Cong et al., "Finding Question-Answer Pairs from Online Forums", SIGIR 2008, Jul. 20-34, 2008, Singapore.

H. Yang et al, "Structured Use of External Knowledge for Event-based Open Domain Question Answering", SIGIR 2003, Toronto, Canada, Jul. 28-Aug. 1, 2003.

L. Lancieri et al., "E-Brainstorming: Optimization of Collaborative Learning Thanks to Online Questionnaires", IADIS International Conference—Cognition and Exploratory Learning in Digital Age, CELDA, 2005.

Petr Sosnin, "Means of Question-Answer Interaction for Collaborative Development Activity", Advances in Human-Computer Interaction, vol. 2009, Article ID 619405, Hindawi Publishing Corporation, 18 pages.

\* cited by examiner

OPEN ENDED QUESTION IDENTIFICATION FOR INVESTIGATIONS

BACKGROUND

The present invention generally relates to question identification, and more specifically, to open ended question identification for investigations.

For most investigations, an analysis of the available data can be a time consuming process of searching through individual pieces of text, videos, and images and evaluating, and transforming this available data into an organized framework to aid in furthering the investigation. With such a large range of data types and available information with today's information technologies, finding relevant information in an evolving investigation can be challenging. Usually, an investigator will require tools to efficiently find scattered but related information. For example, eye witness statements may be related to a user's cell phone video recording footage. This becomes more of an issue when an investigator might not initially know what to look for in an investigation.

SUMMARY

Embodiments of the present invention are directed to a computer-implemented method for question identification. A non-limiting example of the computer-implemented method includes receiving, by a processor, an investigation profile, wherein the investigation profile associated with an investigation comprises a plurality of questions. Observation data associated with the investigation is received and one or more concepts are extracted from the observational data. The one or more concepts are mapped to the plurality of questions to generate one or more answers to the plurality of questions. The one or more answers to the plurality of questions are analyzed to identify unanswered questions from the plurality of questions.

Embodiments of the present invention are directed to a system for question identification. A non-limiting example of the system includes receiving, by a processor, an investigation profile, wherein the investigation profile associated with an investigation comprises a plurality of questions. Observation data associated with the investigation is received and one or more concepts are extracted from the observational data. The one or more concepts are mapped to the plurality of questions to generate one or more answers to the plurality of questions. The one or more answers to the plurality of questions are analyzed to identify unanswered questions from the plurality of questions.

Embodiments of the invention are directed to a computer program product for question identification, the computer program product comprising a computer readable storage medium having program instructions embodied therewith. The program instructions are executable by a processor to cause the processor to perform a method. A non-limiting example of the method includes receiving, by a processor, an investigation profile, wherein the investigation profile associated with an investigation comprises a plurality of questions. Observation data associated with the investigation is received and one or more concepts are extracted from the observational data. The one or more concepts are mapped to the plurality of questions to generate one or more answers to the plurality of questions. The one or more answers to the plurality of questions are analyzed to identify unanswered questions from the plurality of questions.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising,"

"includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
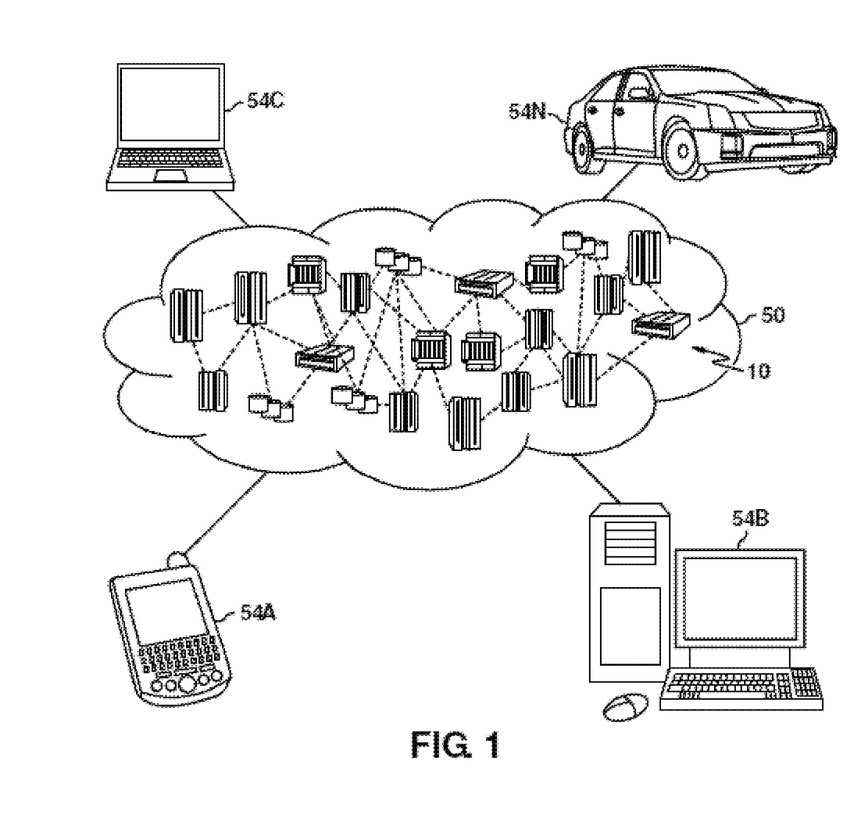
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
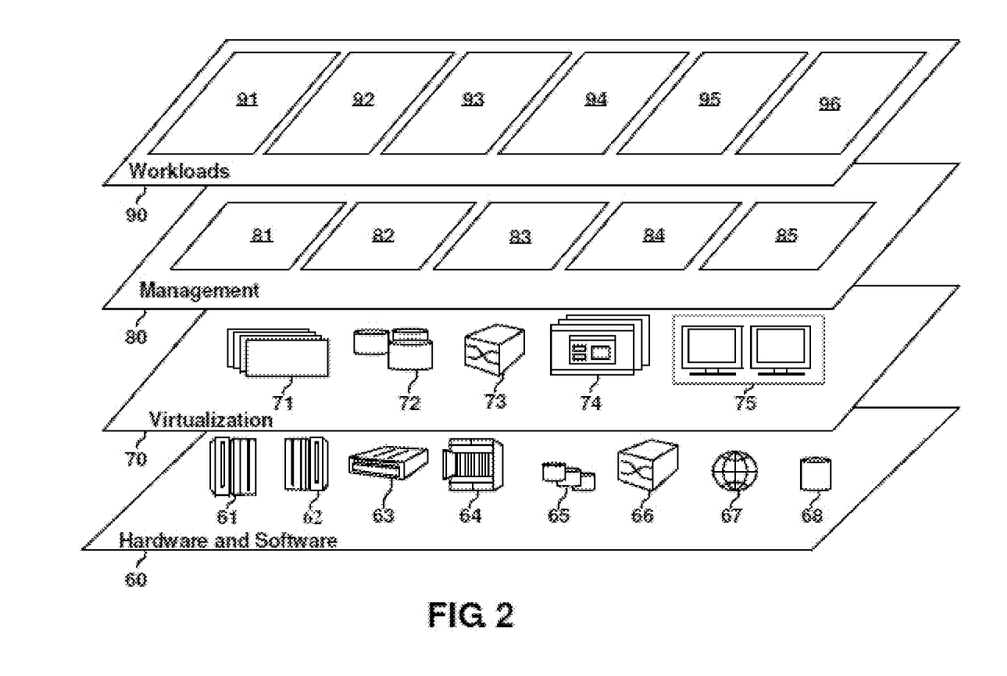
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and open ended question identification 96.

Figure 3:
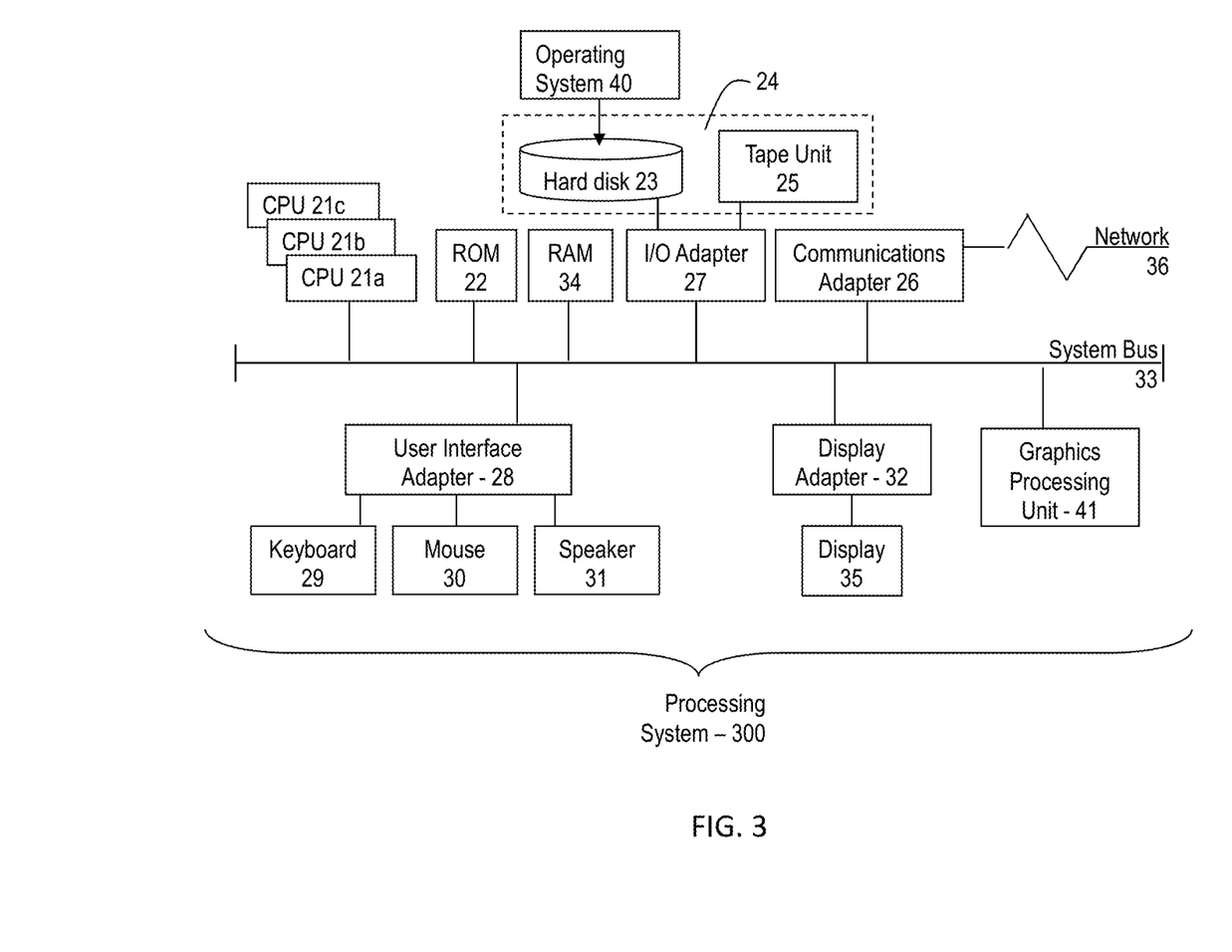
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of technologies that are more specifically relevant to aspects of the invention, most question and answer (Q&A) systems utilize frameworks that are based on a decision tree. A decision tree is a decision support tool that uses a tree-like graph or model of decisions and their possible consequences, including chance event outcomes, resource costs, and utility. More recent Q&A systems utilize a corpus of data to develop a context for a question and then obtain one or more answers. These systems utilize a ranking system to decide which answer is the most accurate answer to the question presented based on the context. When performing an investigation, typically an investigator is not always looking for the best answer to a question but looking at multiple answers with associated confidence scores that can lead to additional questions to help fill in any gaps in information. There exists a need for an investigation tool to assist an investigator with developing open-ended questions for an investigation based on the available data.

Turning now to an overview of the aspects of the invention, one or more embodiments of the invention address the above-described shortcomings of the prior art by providing open ended question identification. A contextual analysis engine can identify all possible question from any content (e.g., observational data) and can identify possible answers for each of the questions with different confidence levels.

The identified questions and answers are arranged in a workflow so that contextual sense of the content can be understood by looking at the Q&A pairs. The contextual analysis engine can identify the open or unanswered questions and can also predict various open or unanswered questions that are not clear from the current content and where an answer could not be predicted. The open or unanswered questions can be arranged based on contextual situations such as, for example, when to ask, where to ask, how to ask, and the like. Any answers identified can change the contextual meaning of the content allowing the contextual analysis engine to revalidate the entire model and modify and/or correct the open question sets and the contextual sequence of the questions.

Figure 4:
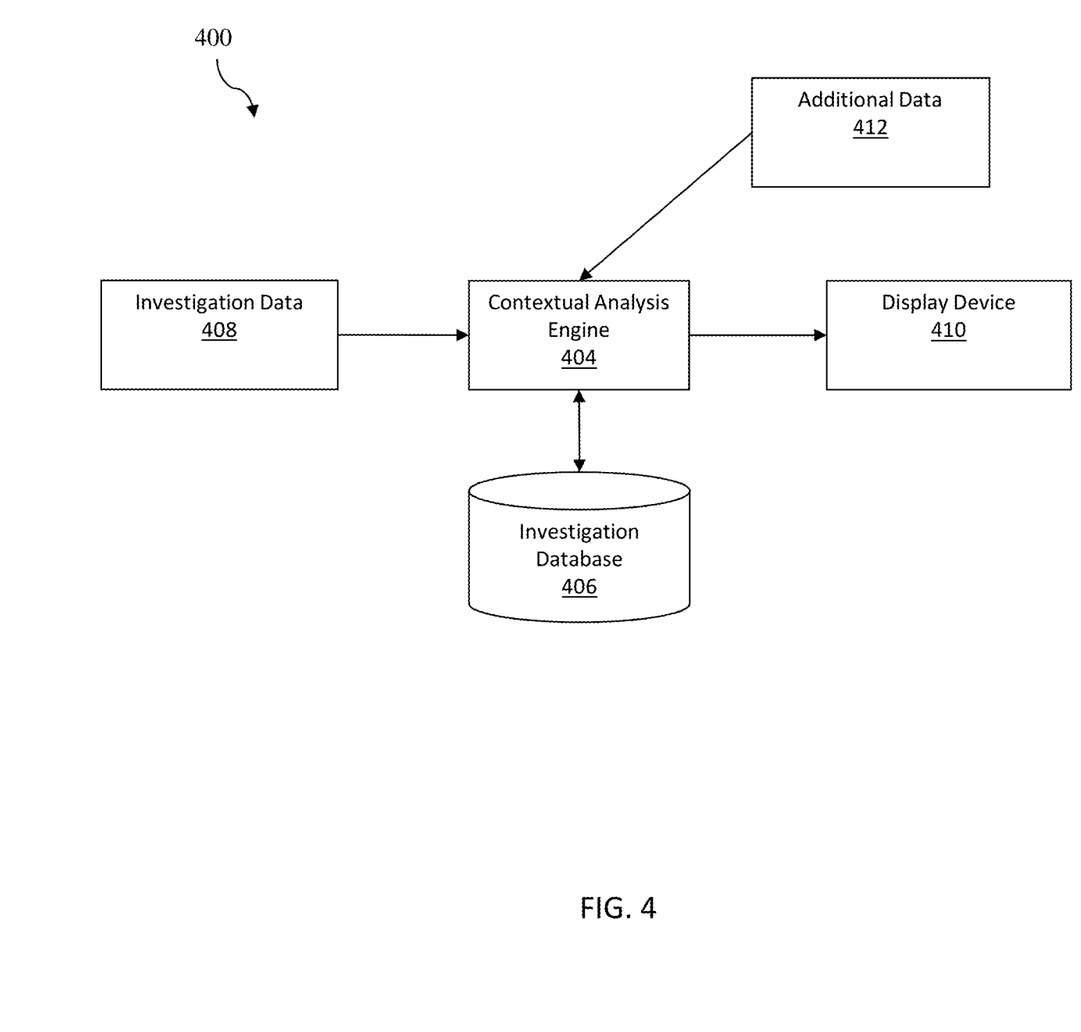
FIG. 4 depicts a system for question identification according to embodiments of the invention.

Turning now to a more detailed description of aspects of the present invention, FIG. 4 depicts a system for question identification according to embodiments of the invention. The system 400 includes a contextual analysis engine 404, an investigation database 406, investigation data 408, a display device 410, and additional data 412.

In one or more embodiments of the invention, the context analysis engine 404, the investigation databased 406, and/or display device 410 can be implemented on the processing system 300 found in FIG. 3. Additionally, the cloud computing system 50 can be in wired or wireless electronic communication with one or all of the elements of the system 400. Cloud 50 can supplement, support or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein In one or more embodiments, the system 400 can be utilized to develop and identify open-ended questions for an investigation. The contextual analysis engine 404 can access an investigation profile from the investigation database 406. The investigation profile can include information about the type of investigation being done such as, for example, a car accident or a missing person investigation. The investigation profile also includes questions, concepts, and tags that are utilized for the investigations. The concepts and tags can include questions that need to be answered about the investigation such as the location of the incident, time of the incident, parties involved, the purpose of the incident, associated objects related to the incident, and/or process information about the incident. The contextual analysis engine 404 can collect or receive investigation data 408. The collection of investigation data 408 can be automated to include internet searches of news articles and/or social media data. The collection of investigation data 408 can also be done manually by an investigator and then inputted into the context analysis engine. The investigation data 408 can include eyewitness statements or reports, newspaper information, social media data, closed circuit television (CCTV) data, data from various internet of things (IoT) devices, video or audio recordings of witnesses or suspects, telephonic conversation data, mobile phone global positioning system (GPS) data, and the like. The contextual analysis engine 404 analyzed the investigation data to extract concepts, tags, and/or features to map to questions about the investigation such as, who, what, where, and how. For example, for a vehicle accident investigation, a news article on the internet or an eye witness statement can be analyzed by the contextual analysis engine 404 to extract answers to questions like the location of the accident. Also, when questions are unanswered from the available investigation data 408 or if the questions are not answered to a degree satisfactory to the investigator, the contextual analysis engine 404 can generate new or follow up questions that need to be answered based on the context of the available answers. For example, if a witness states that the incident occurred in the afternoon and provides no additional details, the system 400 can generate additional questions that would narrow down the time and/or mark the questions as unanswered.

In one or more embodiments of the invention, the observation data 408 is mapped to the concepts, tags, and questions to develop the answers to questions. For example, analysis of a statement might include the inclusion of a street name such as Washington Street. When analyzing this street name, the contextual analysis engine 404 will identify a context for the information presented. The term "Washington" can be a reference to a state, city, or name of a person. When analyzing the total information in the statement, the contextual analysis engine 404 looks at additional information to associate the word "Washington" with a street name and map this information about Washington Street to a concept, tag, or questions related to location instead of a party name involved in the investigation. The context of statements and data in the statements can be determined by the contextual analysis engine 404 to analyze the context of statements made by witnesses, suspects, and other parties associated with an investigation.

Figure 5:
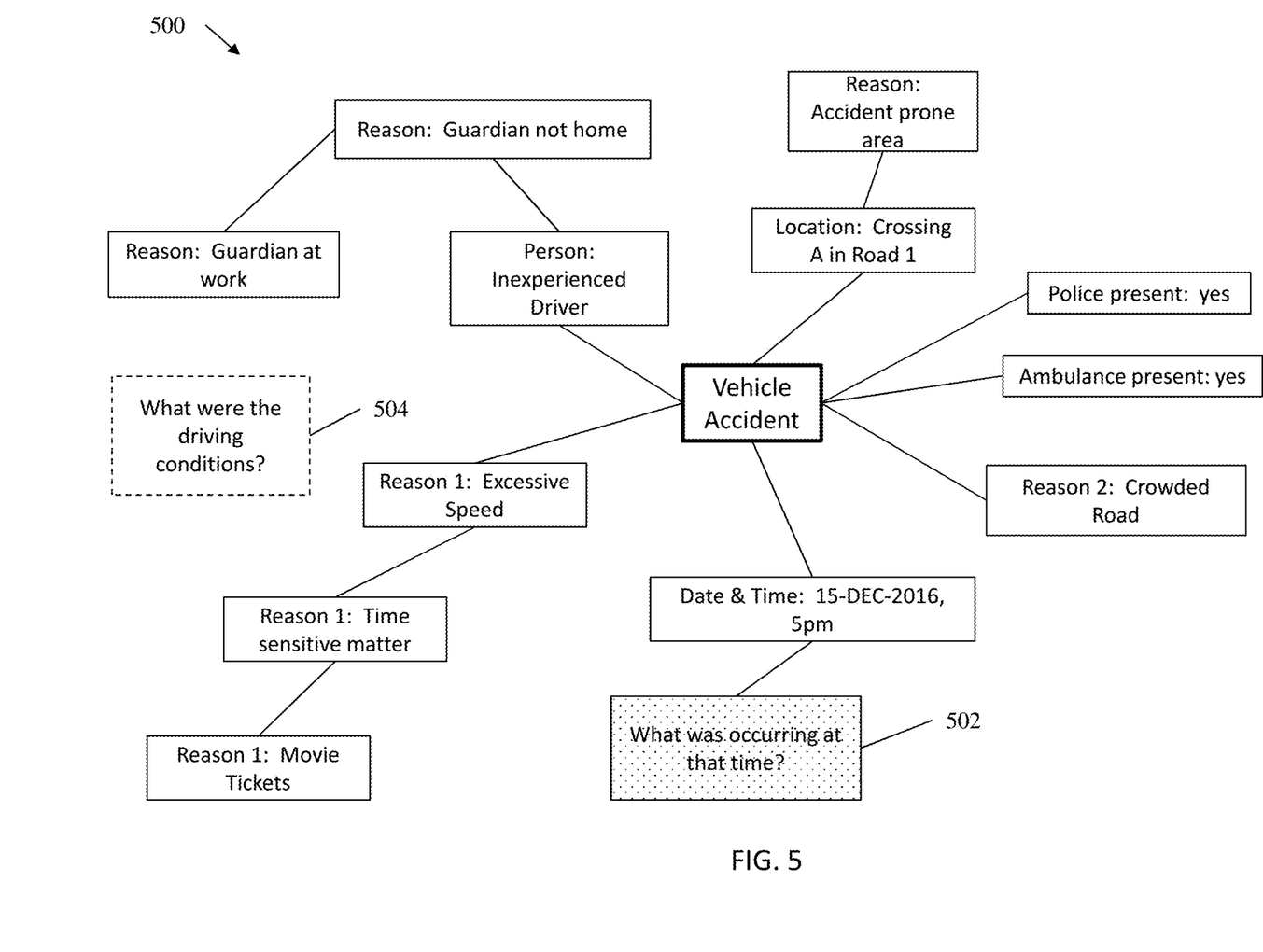
FIG. 5 depicts a block diagram of a graphical sequential diagram according to one or more embodiments of the present invention.

In one or more embodiments of the invention, the contextual analysis engine 404 correlates the concepts and tags with the investigation data to arrange these concepts and tags in a graphical sequential diagram that is displayed on a display device 410. The concepts and tags are associated with the answers to the questions about the investigation. The graphical sequential diagram includes any unanswered questions or new (follow-up) questions. The new questions can be mapped to concepts or tags and displayed proximate to answered questions with same or similar tags in the graphical sequential diagram. FIG. 5 depicts a block diagram of a graphical sequential diagram according to one or more embodiments of the present invention. The graphical sequential diagram 500 includes a graph-like structure that includes investigation data 408 and associated concepts and tags. The exemplary graphical sequential diagram 500 is for a vehicle accident investigation which is displayed at the center of the graphical sequential diagram 500. The investigation data 408 is displayed within the graphical sequential diagram 500 with concepts and tags that are in close proximity to related concepts and tags. For example, data related to the driver (e.g. person: inexperienced driver) includes other tags such as the reason the driver was on the road (e.g., reason: guardian not home) and the reason the guardian was not home (e.g., reason: guardian at work). In addition, the graphical sequential diagram 500 includes other tags such as the cause of the accident which, in the illustrated example, is "excessive speed." The graphical sequential diagram 500 also displays follow up questions 502. For example, the date and time tag includes data regarding the date and time of the incident, however, the date and time issues have not been satisfactorily resolved as the investigation calls for additional information about what was occurring at the time of the incident. For example, was their uncharacteristic traffic due to an event occurring in the area of the incident and the like? This additional data 412 can be collected by the system 400 or manually inputted into the system 400 to update the graphical sequential diagram 500 on the display device 410. In one or more embodiments, new questions 504 can be generated to aid the investigator in the investigation of the vehicle accident. The new question 504 can be located close or proximate to tags or concepts that it is related to such as causation questions related to driving conditions at the time of the incident such as weather, traffic, and the like.

In one or more embodiments of the invention, the new 504 or follow-up 502 questions can be presented in the graphical sequential diagram 500 to include an indicia to identify the new 504 or follow-up 502 questions such as, for example, displaying in a different color, having a different pattern around the question, enlarging the question, and any other type of indicia to differentiate the new 504 or follow-up questions 502. Also, any questions that are deemed to be satisfactorily answered by the investigation data 408 can be marked as closed which means that all possible questions are answered about the concept or tag. This can be displayed in the graphical sequential diagram 500 utilizing graphical techniques to differentiate a closed concept or tag from open concepts or tags. In the illustrated example, the graphical sequential diagram 500 can mark the police present and ambulance present tags, concepts, and answers, as closed since the information, is presented satisfactorily to determine that both the ambulance and the police were present at the incident. Open concepts, tags, and questions can be presented differently in the graphical sequential diagram 500 as well such as causation and the like to identify to the investigator that more information is needed to close these open questions. In one or more embodiments, the location of a new 504 or follow-up 502 questions can be displayed in the graphical sequential diagram 500 based on an anticipated concept for the new 504 or follow-up 502 question. For example, if a new question 504 is generated based on mapping the concepts to the investigation data 408 and new questions 504 is anticipated to be related to a particular concept, the new question can be displayed in a cluster of that particular concept on the graphical sequential diagram 500. Should the concept be location, the graphical sequential diagram 500 can have the location concept defined to a particular grid in the display and all answers related to that concept can be displayed within that particular grid. Further, confidence scores can be defined for each of the questions within the grid and the confidence score can be a numerical value that identifies the confidence in the particular answer based on the investigation data 408 and a contextual analysis as described herein. The new question 504 can be displayed between the related answers for a concept based on the confidence scores of each of the related answers. For example, if three related concepts for incident location carry confidence scores of 0.5, 0.7, and 0.8, respectively, the new question 504 can be displayed at a smaller distance to the answer with the highest confidence score to show both the relation to the concept and the confidence in the respective answers.

In one or more embodiments of the present invention, the system 400 can associate confidence scores with answers to the various questions or data associated with the tags and concepts. The confidence scores can be displayed on the graphical sequential diagram 500 and can be marked with each individual answer, concept, or tag. The confidence scores can illustrate the confidence the system 400 has with the developed answer to an investigation question. Confidence scores associated with concepts such as causation may be lower due to the subjective nature of the concepts. Whereas, confidence scores associated with dates and time are less subjective and can have higher scores due to these concepts being more objective. The contextual analysis engine 404 can identify the veracity of the investigation data be analyzing the context, sentiment, and tone of the data. In one or more embodiments, eyewitness audio data included in the investigation data 408 can be converted to textual data utilizing techniques such as speech to text (STT). The textual data can be analyzed by the contextual analysis engine 404 to determine sentiment and tone to determine information such as veracity of the statements and the like.

In one or more embodiments of the present invention, the sentiment analysis module can be utilized for evaluating the sentiment quality of a statement or communication. The sentiment analysis module may be provided by IBM® WATSON® Alchemy Language application program interface (API) or WATSON® Natural Language Understanding API. The above mentioned APIs are mentioned for exemplary purposes. Any cognitive system can be utilized within the sentiment analysis module. The sentiment analysis module can process natural language to incorporate both a linguistic and statistical analysis in evaluating the context of a communication. In text analysis, the sentiment is the attitude or opinion expressed toward something. Sentiment can be positive, "sounds good", negative, "this is bad", or neutral. Sentiment can be calculated based on keywords extracted and evaluated at a keyword level. Additionally, the sentiment analysis may be capable of identifying negations, such as the term "not" and the change in sentiment from the keyword "good" when the phrase is "not" "good". The sentiment analysis may consider intensity when the terms "very" or other adjectives are utilized in combination with a keyword. Additionally, the keywords may be weighted. For instance, a positive phrase such as "like" will have a predefined positive weight, whereas the phrase "love" might have a higher predefined positive weight. Additionally, negative weights may be afforded negative phrases such as "dislike" would have a predefined negative weight and the phrase "hate" might have a higher negative weight. The sentiment analysis module can evaluate the content to provide a sentiment level. This sentiment level may also include an intensity value.

The tonal analysis module may be IBM® WATSON® Tone analyzer service, for example. The tonal analysis module can use linguistic analysis to detect three types of tones from the text. The natural language content is analyzed by the tonal analysis module for determining the emotional impact, social tone, and writing style that the content projects. The tonal analysis module may provide tonal scores for emotional tone, social tone, and language tone. For emotional tone, the tonal analysis module may utilize the emotions for "joy", "fear", "sadness", "disgust" and "anger". Each natural language element is evaluated with respect to each emotion. Each emotion may be evaluated from lower values having a value range that indicates if that emotion is less likely to appear as perceived or alternatively to a higher value range if the emotion is more likely to be perceived with respect to each natural language content. Other emotions may be utilized as well as a different value score.

For social tone, the five elements of openness, conscientiousness, extraversion, agreeableness, and emotional range are utilized. Openness is evaluated as the extent a person is open to experience a variety of activities. This trait may be provided a value range indicating that it is more likely to be perceived as no-nonsense, straightforward, blunt and obvious, alternatively, a higher value range may be provided if the content indicates that it will be perceived as intellectual, curious, emotionally-aware, or imaginative. Conscientiousness is evaluated as the tendency to act in an organized or thoughtful way. This trait may be provided a value range if the statement is perceived as spontaneous, laid-back, reckless, unmethodical or disorganized, or alternatively, a higher value range may be provided if the content is perceived as disciplined, dutiful, or confident. Extraversion is evaluated as the tendency to seek stimulation in the company of others. This trait may be provided a value range if perceived as independent, timid, introverted, restrained, boring, or alternatively, a higher value range may be provided if the content is perceived as engaging, seeking attention, assertive, sociable. Agreeableness is evaluated as the tendency to be compassionate and cooperative towards others. This trait may be provided a value range if the statement is perceived as selfish, self-serving, uncaring, uncooperative, confrontational or arrogant, or alternatively, a higher value range may be provided if the content is perceived as caring, sympathetic, cooperative, or trustworthy. The emotional range is evaluated as the tendency to be sensitive to the environment. This trait may be provided a value range if the statement is perceived as calm, bland, content, relaxed or alternatively a higher value range may be provided if the content is perceived as concerned, frustrated angry, passionate, upset, stressed or impulsive. These tones, descriptions, and weights are merely illustrative and additional tones, descriptions or weights may be utilized.

Language tones may be analyzed to measure the statements made by a party. The various styles may include analytic, confidence and tentative. The analytic style may focus on the individual's reasoning and analytical attitude about things. The analytic style may be provided a value range if the text contains little or no evidence of analytical tone or alternatively a higher value range if the presentation is more likely to be perceived as intellectual, rational, systematic, emotionless, or impersonal. The confidence style may focus on the person's degree of certainty. The confidence style may be provided a value range if the text contains little or no evidence of confidence in tone or alternatively a higher value range if the style is more likely to be perceived as assured, collected, hopeful or egotistical. The tentative style may focus on the person's degree of inhibition. The tentative style may be provided a lower value range if the text contains little or no evidence of tentativeness in tone or a higher value range if the style is more likely to be perceived as questionable, doubtful limited, or debatable.

In one or more embodiments of the invention, based on the above described analysis of the investigation data 408, the system 400 can develop a confidence score for data extracted from the investigation data 408. In addition to statements, the system 400 can analyze using video processing techniques to analyze a party's body language, facial expression, and the like to determine a confidence in the data being collected about the investigation.

In one or more embodiments of the invention, investigation data 408 can be taken from IoT devices. The term Internet of Things (IoT) device is used herein to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT object may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. IoT devices may include cell phones, desktop computers, laptop computers, tablet computers, personal digital assistants (PDAs), etc. Accordingly, the IoT network can include a combination of "legacy" Internet-accessible devices (e.g., laptop or desktop computers, cell phones, etc.) in addition to devices that do not typically have Internet-connectivity (e.g., dishwashers, etc.).

In one or more embodiments of the invention, data received from electronic devices such as IoT devices, include metadata associated with the data that can be utilized to assist with answering questions such as time, location, and the like. This metadata can aid in developing confidence levels for the answered questions utilizing metadata such as time stamps for a video showing an incident.

Figure 6:
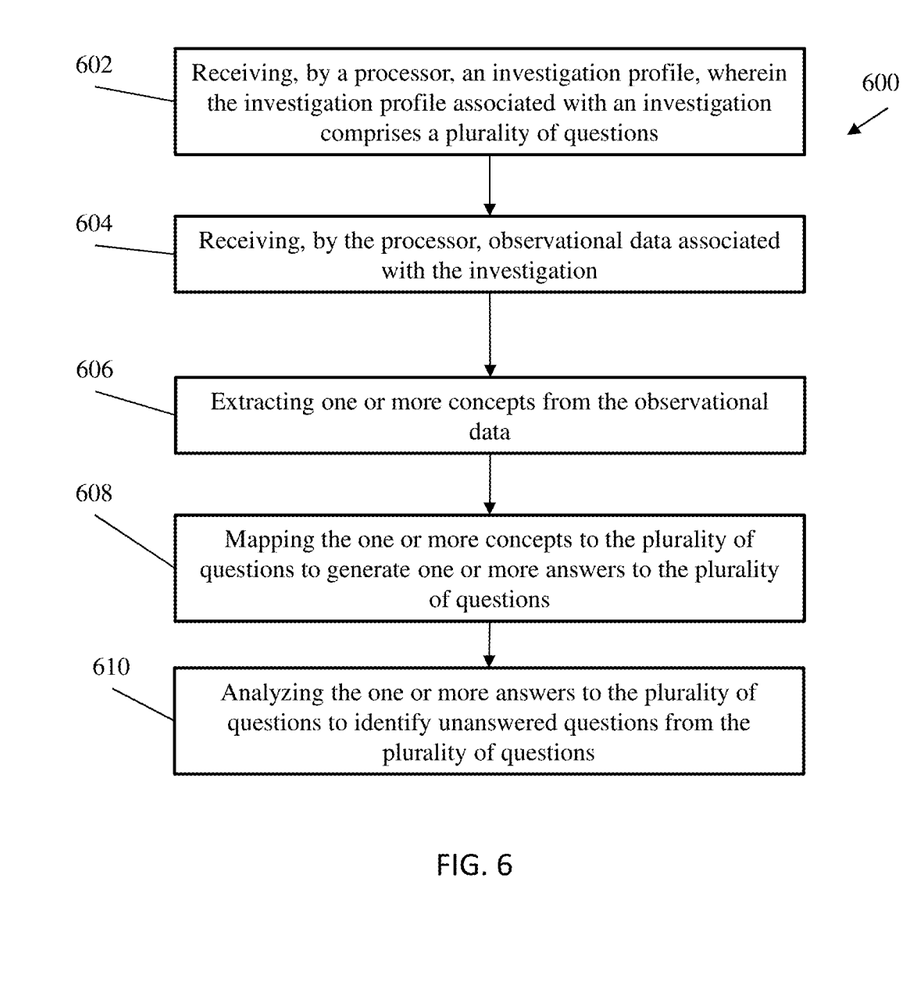
FIG. 6 depicts a flow diagram of a method for question identification according to one or more embodiments of the invention.

In one or more embodiments, answers to any open question can change the contextual meaning of the content, so if any open/unanswered question is answered, then contextual analysis engine 404 will revalidate the investigation and will modify/correct the open question sets and the contextual sequence of the questions. In different stage of the Q&A sequencing of any content, there can be one or more close loop, (it means all possible questions are answered), accordingly software will identify the investigation outcome. The graphical interface will describe the various investigation outcome node and also show the open ended investigation path FIG. 6 depicts a flow diagram of a method for question identification according to one or more embodiments of the invention. The method 600 includes receiving, by a processor, an investigation profile associated with an investigation, wherein the investigation profile comprises a plurality of questions, as shown in block 602. At block 604, the method 600 includes receiving, by the processor, observational data associated with the investigation. The method 600, at block 606, includes extracting one or more concepts from the observational data. The method 600 also includes mapping the one or more concepts to the plurality of questions to generate one or more answers to the plurality of questions, as shown at block 608. And at block 610, the method 600 includes identifying unanswered questions from the plurality of questions based at least in part on the mapping the one or more concepts to the plurality of questions.

Additional processes may also be included. It should be understood that the processes depicted in FIG. 6 represent illustrations, and that other processes may be added or existing processes may be removed, modified, or rearranged without departing from the scope and spirit of the present disclosure.

Figure 7:
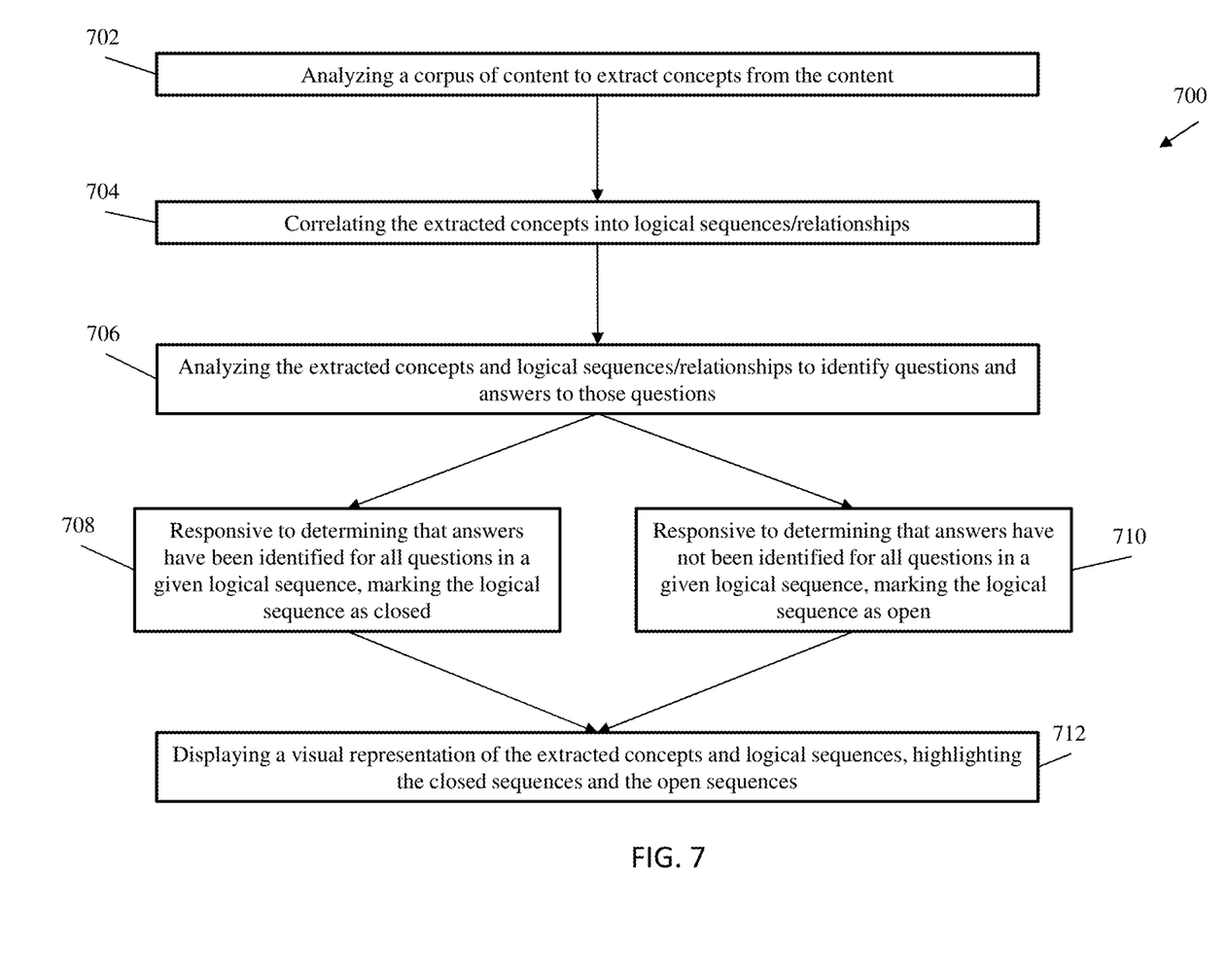
FIG. 7 depicts a flow diagram of an alternate embodiment of a method for question identification according to one or more embodiments of the invention.

FIG. 7 depicts a flow diagram of an alternate embodiment of a method for question identification according to one or more embodiments of the invention. The method 700 includes analyzing a corpus of context to extract concepts from the content, as shown in block 702. The corpus of content can include images, video, audio, and text content. The concepts can include tags, keywords, recognized persons, places, objects, and metadata for the analyzed data. The method 700, at block 704, includes correlating the extracted concepts into logical sequences and/or relationships. For example, the correlation can be based on matching related concepts or data sources or ordering based on sequences of events. At block 706, the method 700 includes analyzing the extracted concepts and logical sequences/relationships to identify questions and answers to those questions. Initially, the system 400 attempts to answer questions about the investigation based one the available information. Then, at block 708, the method 700 includes responsive to determining that answers have been identified for all questions in a given logical sequence, marking the logical sequence as closed. A closed logical sequence indicates the sequence has been fully answered in a satisfactory and complete manner. However, at block 710, the method 700 includes responsive to determining that answers have not been identified for all questions in a given logical sequence, marking the logical sequence as open. The open question allows for the generation of follow up or new questions regarding the investigation. The method 700 includes displaying a visual representation of the extracted concepts and logical sequences, highlighting the closed sequences and the open sequences, at block 712. The visual representation can be the logical sequential graph 500 in FIG. 5, for example.

Additional processes may also be included. It should be understood that the processes depicted in FIG. 7 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for question identification, the method comprising:
    receiving, by a processor, an investigation profile associated with an investigation, wherein the investigation profile comprises a plurality of questions;
    receiving, by the processor, observational data associated with the investigation;
    extracting one or more concepts from the observational data;
    associating each concept in the one or more concepts to the plurality of questions;
    generating one or more answers to the plurality of questions based on the observational data;
    identifying unanswered questions from the plurality of questions based at least in part on the associating the one or more concepts to the plurality of questions;
    displaying, in a graphical sequence diagram on a display device, the unanswered questions and the one or more answers to the plurality of questions;
    generating a confidence score for each of the one or more answers, wherein the one or more answers are displayed proximately to the unanswered questions based on the confidence score.

2. The computer-implemented method of claim 1, wherein the one or more answers to the plurality of questions are displayed sequentially in the graphical sequence diagram based on an occurrence of events in the investigation.

3. The computer-implemented method of claim 1, further comprising generating one or more new questions based at least in part on the associating the one or more concepts to the one or more questions.

4. The computer-implemented method of claim 3, further comprising displaying, in the graphical sequence diagram, the one or more new questions.

5. The computer-implemented method of claim 4, wherein the one or more new questions are displayed proximately to related answered questions in the graphical sequence diagram.

6. The computer-implemented method of claim 4, wherein the one or more new questions displayed in the graphical sequence diagram are displayed with a pattern around the one or more new questions that is different from the unanswered question.

7. The computer-implemented method of claim 1, further comprising generating an alert based at least in part on the identifying unanswered questions.

8. The computer-implemented method of claim 7, wherein the alert is electronically transmitted to at least one investigator.

9. The computer-implemented method of claim 1, further comprising:
    receiving additional observational data associated with the investigation;
    extracting one or more additional concepts from the additional observational data; and
    mapping the one or additional concepts to the identified unanswered questions to generated one or more new answers to the identified unanswered questions.

10. The computer-implemented method of claim 9, further comprising updating the graphical sequence diagram with the one or more new answers.

11. The computer-implemented method of claim 1, wherein the observational data comprises at least one of an image, a video, and a text.

12. A system for question identification, the system comprising:
    a processor communicatively coupled to a memory, the processor configured to:
    receive an investigation profile associated with an investigation, wherein the investigation profile comprises a plurality of questions;
    receive observational data associated with the investigation;
    extract one or more concepts from the observational data;
    associate each concept in the one or more concepts to the plurality of questions;
    generate one or more answers to the plurality of questions based on the observational data;
    identify unanswered questions from the plurality of questions based at least in part on the mapping the one or more concepts to the plurality of questions; and
    display, in a graphical sequence diagram on a display device, the unanswered questions and the one or more answers to the plurality of questions;
    generating a confidence score for each of the one or more answers, wherein the one or more answers are displayed proximately to the unanswered questions based on the confidence score.

13. The system of claim 12, wherein the one or more answers to the plurality of questions are displayed sequentially in the graphical sequence diagram based on an occurrence of events in the investigation.

14. The system of claim 12, wherein the processor is further configured to generate one or more new questions based at least in part on the associating the one or more concepts to the one or more questions.

15. The system of claim 14, wherein the processor is further configured to display, in the graphical sequence diagram, the one or more new questions.

16. A computer program product for question identification comprising a computer readable storage medium having program instructions embodied therewith, where the program instructions are executable by a processor to cause the processor to perform a method comprising:

receiving, by a processor, an investigation profile associated with an investigation, wherein the investigation profile comprises a plurality of questions;

receiving, by the processor, observational data associated with the investigation;

extracting one or more concepts from the observational data;

associating each concept in the one or more concepts to the plurality of questions;

generating one or more answers to the plurality of questions based on the observational data;

identifying unanswered questions from the plurality of questions based at least in part on the associating the one or more concepts to the plurality of questions; and displaying, in a graphical sequence diagram on a display device, the unanswered questions and the one or more answers to the plurality of questions;

generating a confidence score for each of the one or more answers, wherein the one or more answers are displayed proximately to the unanswered questions based on the confidence score.

17. The computer program product of claim 16, wherein the one or more answers to the plurality of questions are displayed sequentially in the graphical sequence diagram based on an occurrence of events in the investigation.

18. The computer program product of claim 16, further comprising generating one or more new questions based at least in part on the mapping associating the one or more concepts to the one or more questions.

19. The computer program product of claim 18, further comprising displaying, in the graphical sequence diagram, the one or more new questions.

* * * * *